United States Patent
Wang et al.

(10) Patent No.: US 11,719,380 B1
(45) Date of Patent: Aug. 8, 2023

(54) HIGH-STABILITY 360-DEGREE PHOTO BOOTH

(71) Applicant: MARVEL TECHNOLOGY (CHINA) CO., LIMITED, Shenzhen (CN)

(72) Inventors: Ruifeng Wang, Shenzhen (CN); Yuqing Mei, Shenzhen (CN)

(73) Assignee: MARVEL TECHNOLOGY (CHINA) CO., LIMITED, Shenzhen (CN)

( * ) Notice: Subject to any disclaimer, the term of this patent is extended or adjusted under 35 U.S.C. 154(b) by 0 days.

(21) Appl. No.: 17/975,642

(22) Filed: Oct. 28, 2022

(30) Foreign Application Priority Data

Apr. 15, 2022 (CN) .......................... 202220876418.9

(51) Int. Cl.
*F16M 11/08* (2006.01)

(52) U.S. Cl.
CPC ......... *F16M 11/08* (2013.01); *F16M 2200/08* (2013.01)

(58) Field of Classification Search
CPC ........................... F16M 2200/08; F16M 11/08
USPC .............. 108/27, 153.1, 183, 191, 190, 139; 248/425, 131, 188, 158, 349.1; 297/344.21, 182, 423.46, 423.44, 423.19, 297/423.12, 423.22, 440.22
See application file for complete search history.

(56) References Cited

U.S. PATENT DOCUMENTS

| | | | | |
|---|---|---|---|---|
| 688,489 A * | 12/1901 | Sattel | ................... | A47B 13/021 211/172 |
| 1,385,762 A * | 7/1921 | Topor | ................... | A47B 11/00 312/285 |
| 1,689,160 A * | 10/1928 | Siegrist | ................... | B60S 13/02 104/44 |
| 2,459,017 A * | 1/1949 | Crew | ................... | A47B 11/00 108/139 |
| 3,103,899 A * | 9/1963 | Macken | ................ | A47B 13/023 108/150 |
| 3,343,901 A * | 9/1967 | Marcus | ................... | A41H 9/02 223/1.1 |
| 3,593,954 A * | 7/1971 | Ritchie | ................... | A47C 3/18 297/344.21 |
| 4,911,391 A * | 3/1990 | Ellis | ........................ | A47B 91/00 248/188.7 |
| 5,660,361 A * | 8/1997 | Penger | ................... | B23B 31/16 248/346.06 |
| 6,896,330 B1 * | 5/2005 | Yu | .......................... | A47C 15/00 297/344.21 |
| 7,886,674 B2 * | 2/2011 | Behnke | ................ | A47B 13/023 108/150 |
| 8,505,245 B2 * | 8/2013 | Bobryshev | ............... | G09B 5/08 434/350 |
| 9,578,969 B1 * | 2/2017 | Su | ............................ | A47C 7/52 |

(Continued)

*Primary Examiner* — Jose V Chen

(57) ABSTRACT

A high-stability 360-degree photo booth includes a supporting main shaft and a supporting base. The supporting base includes at least two supporting rods intersecting and connected with each other, or the supporting base includes a supporting ring and at least one supporting rod connected to the supporting ring. A plurality of anti-collision slots capable of engaging with the supporting rod is defined at a first end of the supporting main shaft. The at least two supporting rods are or the at least one supporting rod is welded to the supporting main shaft at a portion where the supporting main shaft is engaged with the at least two supporting rods are or the at least one supporting rod.

16 Claims, 11 Drawing Sheets

(56) References Cited

U.S. PATENT DOCUMENTS

| | | | | |
|---|---|---|---|---|
| 2004/0195886 A1* | 10/2004 | Beatty | ............... | B60N 2/938 |
| | | | | 297/344.21 |
| 2006/0124818 A1* | 6/2006 | Wai | .................. | F16M 11/08 |
| | | | | 248/349.1 |
| 2006/0175518 A1* | 8/2006 | Hu | .................... | A47C 9/007 |
| | | | | 248/157 |
| 2008/0093909 A1* | 4/2008 | Deng | ................. | A47C 7/16 |
| | | | | 297/440.16 |
| 2015/0122958 A1* | 5/2015 | Chen | ................. | A47C 7/004 |
| | | | | 248/158 |
| 2017/0350552 A1* | 12/2017 | James | ............. | A47B 13/021 |
| 2018/0299061 A1* | 10/2018 | Neundorf | ........ | F16M 11/041 |

\* cited by examiner

HIGH-STABILITY 360-DEGREE PHOTO BOOTH

TECHNICAL FIELD

The present disclosure relates to a technical field of photographic camera devices, in particular to a high-stability 360-degree photo booth.

BACKGROUND

Nowadays, with the development of technologies, photography and videography have become popular, shooting images is no longer a luxury, and selfie is more casual. 360-degree photo booths, also called 360Photobooth, are platforms for 360-degree surround shooting. Compared with ordinary selfie devices, the 360-degree photo booths provide further entertainment experience.

However, current 360-degree photo booths have low structural stability and low safety factor for users.

SUMMARY

Aiming at the above problems, the present disclosure proposes a high-stability 360-degree photo booth to solve the technical problems in background technologies.

In order to achieve above aims, the present disclosure provides a high-stability 360-degree photo booth, including a supporting main shaft and a supporting base, the supporting base includes at least two supporting rods intersecting and connected with each other, or the supporting base includes a supporting ring and at least one supporting rod connected to the supporting ring, a plurality of anti-collision slots capable of engaging with the supporting rod is defined at a first end of the supporting main shaft, and the at least two supporting rods are or the at least one supporting rod is welded to the supporting main shaft at a position where the supporting main shaft is engaged with the at least two supporting rods are or the at least one supporting rod.

Furthermore, a quantity of the supporting rods is two, the at least two supporting rods include a first supporting rod and a second supporting rod, an evading slot capable of engaging with the second supporting rod is defined at the first supporting rod, and both ends of the first supporting rod and the second supporting rod are connected to the supporting ring.

Furthermore, a quantity of the supporting rods is three, the at least two supporting rods include a third supporting rod, a fourth supporting rod, and a fifth supporting rod. The third supporting rod and the fourth supporting rod have approximately same lengths. Two ends of the fifth supporting rod are respectively connected to the supporting ring, a first end of the third supporting rod and a first end of the fourth supporting rod are respectively connected to the supporting ring, a second end of the third supporting rod and a second end of the fourth supporting rod are respectively connected to a middle portion of the fifth supporting rod, and edges of the plurality of the anti-collision slots are welded to the third supporting rod, the fourth supporting rod, and the fifth supporting rod. Or the at least two supporting rods include a sixth supporting rod, a seventh supporting rod, and an eighth supporting rod. The sixth supporting rod, the seventh supporting rod, and the eighth supporting rod have approximately same lengths. A first end the sixth supporting rod, a first end of the seventh supporting rod, and a first end of the eighth supporting rod are connected to the supporting ring, a second end of the sixth supporting rod, a second end of the seventh supporting rod, and a second end of the eighth supporting rod are connected with each other, and edges of the plurality of the anti-collision slots are welded to the sixth supporting rod, the seventh supporting rod, and the eighth supporting rod.

Furthermore, the supporting main shaft is located approximately at a center of the supporting base, and the supporting main shaft is coaxial with the supporting ring.

Furthermore, the high-stability 360-degree photo booth includes a supporting stage connected to a second end of the supporting main shaft. The supporting stage includes a supporting cover plate and a reinforcement frame, the supporting cover plate detachably covers the reinforcement frame, and a shock absorber is disposed between the supporting cover plate and the reinforcement frame.

Furthermore, the high-stability 360-degree photo booth includes a supporting stage and a supporting main shaft a first connecting portion is disposed at a first end of the supporting main shaft, a second connecting portion sleeved on the first connecting portion is disposed at the supporting stage, a threaded through hole is defined in the second connecting portion, the threaded through hole is penetrated through by a locking screw to abut against an outer wall of the first connecting portion to reinforce connection between the supporting stage and the supporting main shaft.

Furthermore, the high-stability 360-degree photo booth includes a bearing, a transmission part, a first connecting part, a second connecting part, and a locking key. An inner ring of the bearing is sleeved on an outer wall of the supporting main shaft, the transmission part is sleeved on an outer ring of the bearing, a first connecting slot and a second connecting slot are defined in the bearing, the first connecting part and the second connecting part are respectively connected to the first connecting slot and the second connecting slot to clamp and fix the transmission part between the first connecting part and the second connecting part, and a key slot is defined between the bearing and the transmission part, the locking key is accommodated in the key slot, and the locking key is limited between the first connecting part and the second connecting part.

The present disclosure further provides a high-stability 360-degree photo booth, including a supporting stage. The supporting stage includes a supporting cover plate and a reinforcement frame, and a shock absorber is disposed between the supporting cover plate and the reinforcement frame.

Furthermore, the shock absorber is a shock-absorbing cotton pad, and the shock-absorbing cotton pad is shaped like an upper end surface of the reinforcing frame.

The present disclosure further provides a high-stability 360-degree photo booth, including a supporting stage and a supporting main shaft, wherein a first connecting portion is disposed at a first end of the supporting main shaft, a second connecting portion sleeved on the first connecting portion is disposed at the supporting stage, a threaded through hole is defined in the second connecting portion, the threaded through hole is penetrated through by a locking screw to abut against an outer wall of the first connecting portion to reinforce connection between the supporting stage and the supporting main shaft.

Compared with prior art, the present disclosure provides a high-stability 360-degree photo booth, the plurality of the anti-collision slots capable of engaging with the one or more of supporting rods are defined at the first end of the supporting main shaft, the first end of the supporting main shaft is disposed on the one or more of supporting rods, the plurality of the anti-collision slots accommodates the one or more of supporting rods, and the one or more of the supporting rods are welded to the supporting main shaft along an edge of a position where the plurality of the anti-collision slots are engaged with the one or more of the supporting rods, which increases a length of the welding line and enhances reinforce connection between the one or more of the supporting rods and the supporting main shaft. Moreover, overall stability of the 360-degree photo booth is reinforced, safety factor of the 360-degree photo booth is improved, service life is prolonged, and maintenance cost is reduced.

Through disposing the shock absorber between the supporting cover plate and the reinforcement frame, shock absorption capability of the 360-degree photo booth can be greatly improved, stability in use of the 360-degree photo booth is improved, and user experience is improved. Moreover, the shock absorber not only reduces power transmitted to shooting device from users to prevent the 360-degree photo booth from shaking, but also extends service life of the supporting cover plate and the reinforcement frame, and reduces maintenance cost of the 360-degree photo booth to a certain extent, thereby saving more resources.

Through defining the threaded through hole in the second connecting portion, and penetrating through the threaded through hole with the locking screw to abut against the outer wall of the first connecting portion to reinforce the connection between the supporting stage and the supporting main shaft for purpose of anti-loose and anti-vibration, which greatly avoids instability and loose showing connection between the supporting stage and the supporting main shaft, and avoids hidden dangers to user's safety caused by relative movements between the supporting stage and the supporting main shaft, such as circumferential relative rotation and axial movement.

Figure 1:
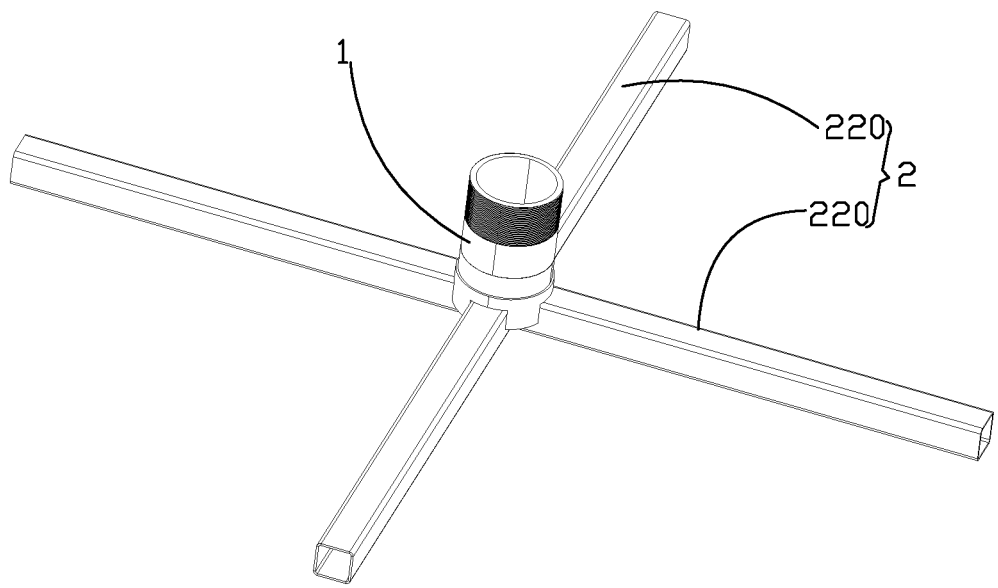
FIG. 1 is a structural schematic diagram of a 360-degree photo booth according to embodiment 1 of the present disclosure.

Reference number in the drawings: 1—supporting main shaft, 110—anti-collision slot, 120—first connecting portion, 2—supporting base, 210—supporting ring, 220—supporting rod, 221—first supporting rod, 2211—evading slot, 222—second supporting rod, 223—third supporting rod, 224—fourth supporting rod, 225—fifth supporting rod, 226—sixth supporting rod, 227—seven supporting rod, 288—eighth supporting rod, 3—supporting stage, 310—supporting cover plate, 320—reinforcement frame, 330—shock absorber, 340—second connecting portion, 341—threaded through hole, 4—locking screw, 5—bearing, 510—first connecting slot, 520—second connecting slot, 6—transmission part, 7—end cover, 8—first connecting part, 810—connecting hole, 9—second connecting part, 10—locking key, 11—key slot, 12—rotating shooting stand, 14—foot.

DETAILED DESCRIPTION OF PREFERRED EMBODIMENTS

The present disclosure provides a high-stability 360-degree photo booth, including a supporting main shaft 1 and a supporting base 2. The supporting base 2 includes at least two supporting rods 220 intersecting and connected with each other, or the supporting base 2 includes a supporting ring 210 and at least one supporting rod 220 connected to the supporting ring 210. A plurality of anti-collision slots 110 capable of engaging with the supporting rod 220 is defined at a first end of the supporting main shaft 1, and the at least two supporting rods 220 are or the at least one supporting rod 220 is welded to the supporting main shaft 1 at a position where the supporting main shaft 220 is engaged with the at least two supporting rods are or the at least one supporting rod.

Figure 2:
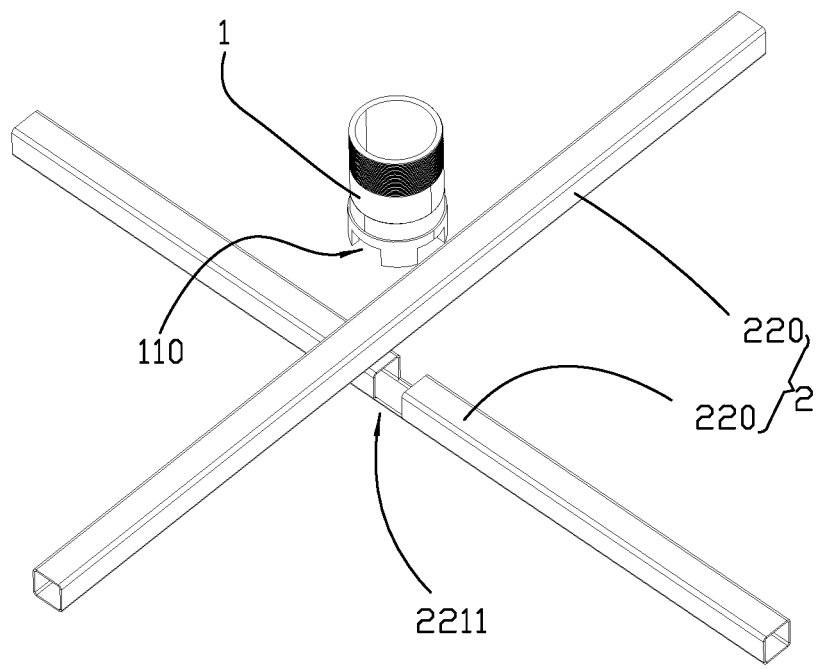
FIG. 2 is an exploded diagram of the 360-degree photo booth according to embodiment 1 of the present disclosure.
Figure 10:
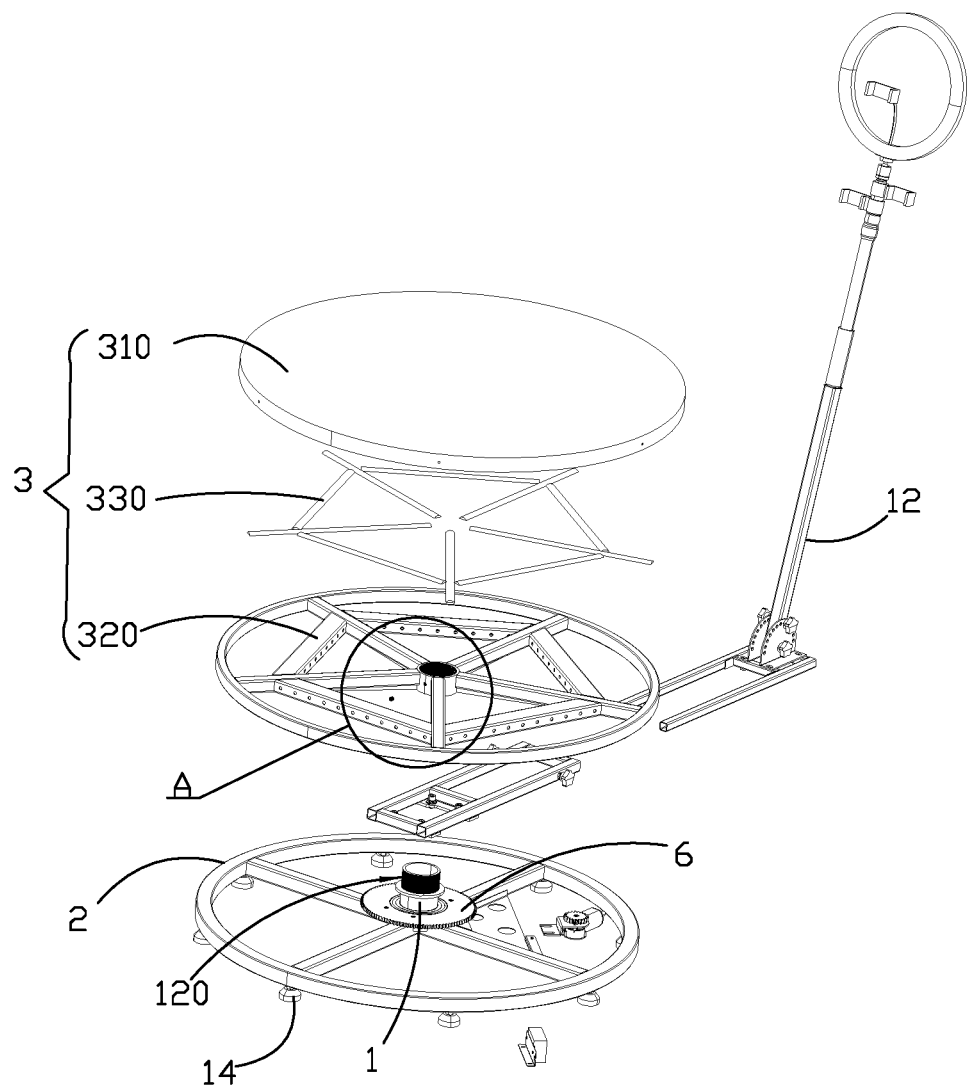
FIG. 10 is a structural schematic diagram of a 360-degree photo booth according to embodiment 5 or 6 of the present disclosure.

Referring to FIGS. 1, 2 and 10, embodiment 1: the supporting base 2 includes at least two supporting rods 220 intersecting and connected with each other, each of the plurality of the anti-collision slots 11 is engaged with one of the at least two supporting rods 220, or each of the plurality of the anti-collision slots 11 is engaged with an intersection of the at least two supporting rods 220, and the at least two supporting rods 220 are welded to the supporting main shaft 1 at a position where the supporting main shaft 1 is engaged with the at least two supporting rods 220.

Figure 3:
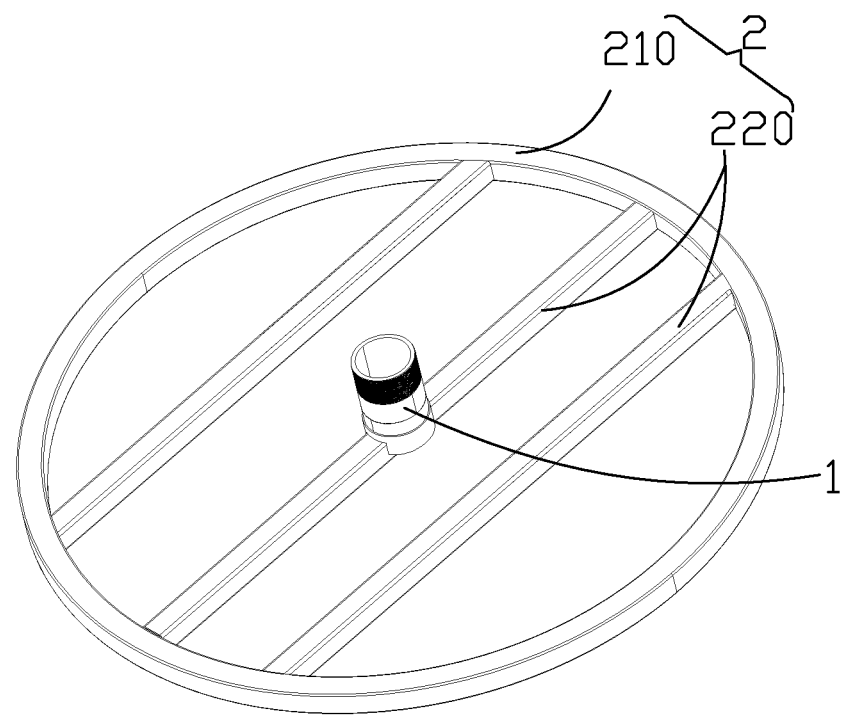
FIG. 3 is a structural schematic diagram of a 360-degree photo booth according to embodiment 2 of the present disclosure.
Figure 4:
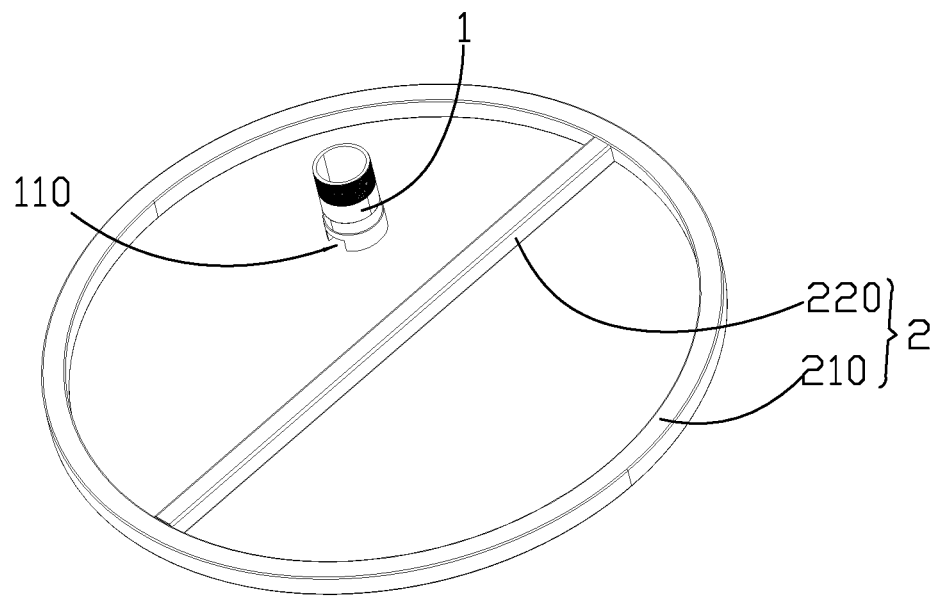
FIG. 4 is an exploded diagram of the 360-degree photo booth according to embodiment 2 of the present disclosure.

Referring to FIGS. 3, 4 and 10, embodiment 2: the supporting base 2 includes a supporting ring 210 and at least one supporting rod 220 connected to the supporting ring 210, two ends of the at least one supporting rod 220 can be connected to an inner ring of the supporting ring 210. The plurality of the anti-collision slots 110 is engaged with the at least one supporting rod 220, and the at least one supporting rod 220 is welded to the supporting main shaft 1 at a position where the supporting main shaft 1 is engaged with the at least two supporting rods 220. In the embodiment, the at least one supporting rod 220 is connected to the inner ring of the supporting ring 210, both ends of the at least one supporting rod 220 are connected to the inner ring of the supporting ring 210, and both ends of the at least one supporting rod 220 are welded to the supporting ring 210.

The plurality of the anti-collision slots 110 capable of engaging with the one or more of supporting rods 220 is defined at the first end of the supporting main shaft 1, the first end of the supporting main shaft 1 is disposed on the one or more of supporting rods 220, the plurality of the anti-collision slots 110 accommodates the one or more of supporting rods 220, and the one or more of supporting rods 220 are welded to the supporting main shaft 1 at an edge of a position where the plurality of the anti-collision slots 110 is engaged with the one or more of the supporting rods, which increases a length of the welding line, reinforce connection between the one or more of supporting rods and the supporting main shaft, the overall stability of the 360-degree photo booth is further reinforced, safety factor of the 360-degree photo booth is improved, service life is prolonged, and maintenance cost is reduced.

Figure 5:
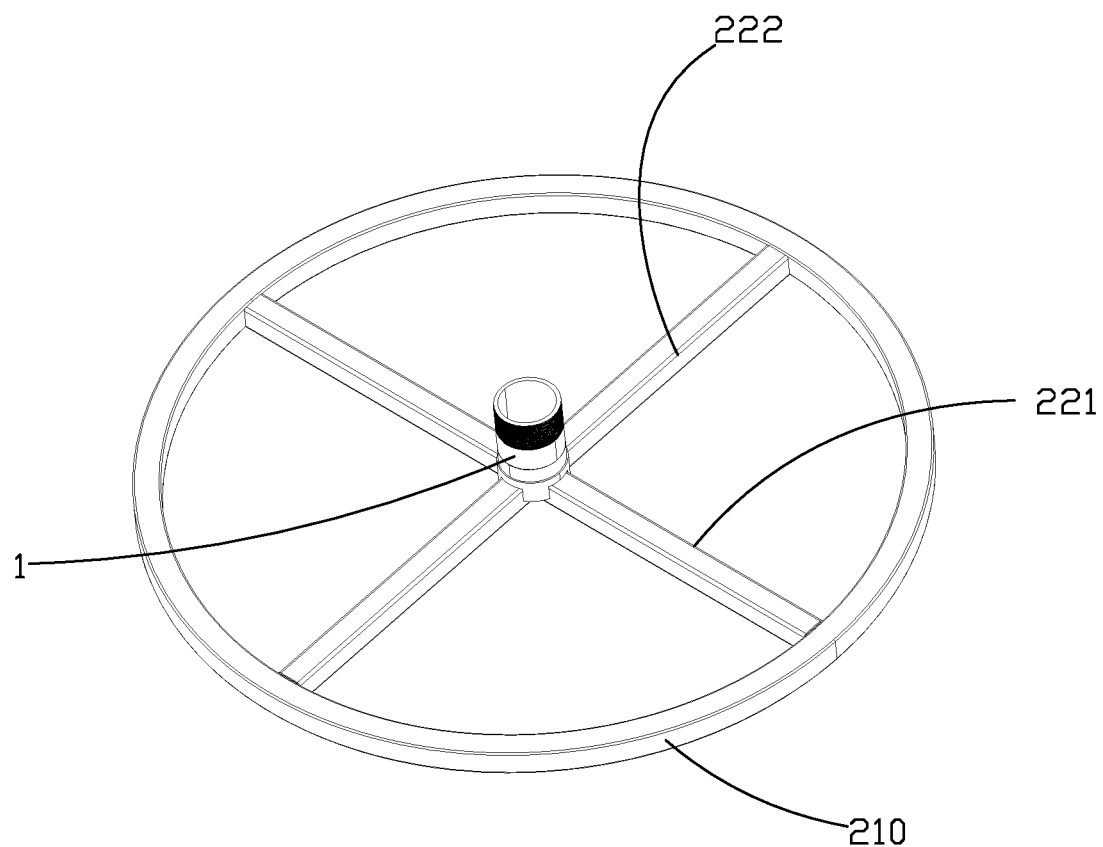
FIG. 5 is a structural schematic diagram of a 360-degree photo booth according to embodiment 3 of the present disclosure.
Figure 6:
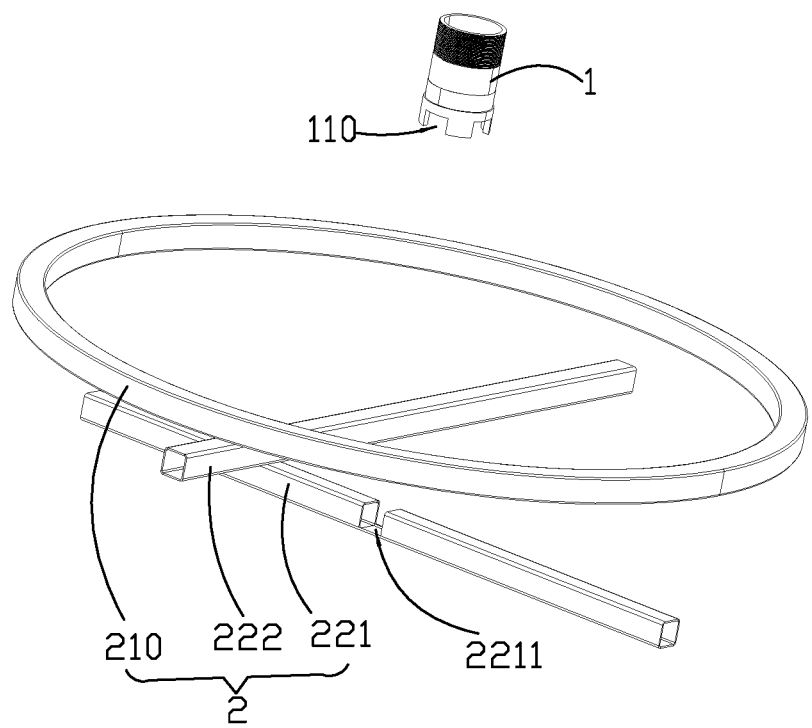
FIG. 6 is an exploded diagram of the 360-degree photo booth according to embodiment 3 of the present disclosure.

Referring to FIGS. 5, 6 and 10, embodiment 3: a quantity of the supporting rods is two, the supporting rods 220 includes a first supporting rod 221 and a second supporting rod 222, an evading slot 2211 capable of engaging with the second supporting rod 222 is defined at the first supporting rod 221, and both ends of the first supporting rod 221 and the second supporting rod 222 are connected to the supporting ring 210.

In the embodiment, when the quantity of the supporting rods is two, the supporting rods 220 roughly form a "cross" through the evading slot 2211 defined in the first supporting rod 221. And a quantity of the anti-collision slots 110 is four correspondingly to the "cross", the supporting rods 220 are engaged in the four anti-collision slots 110 at a position where the supporting rods intersect with each other.

Furthermore, a quantity of the supporting rods is three.

Figure 7:
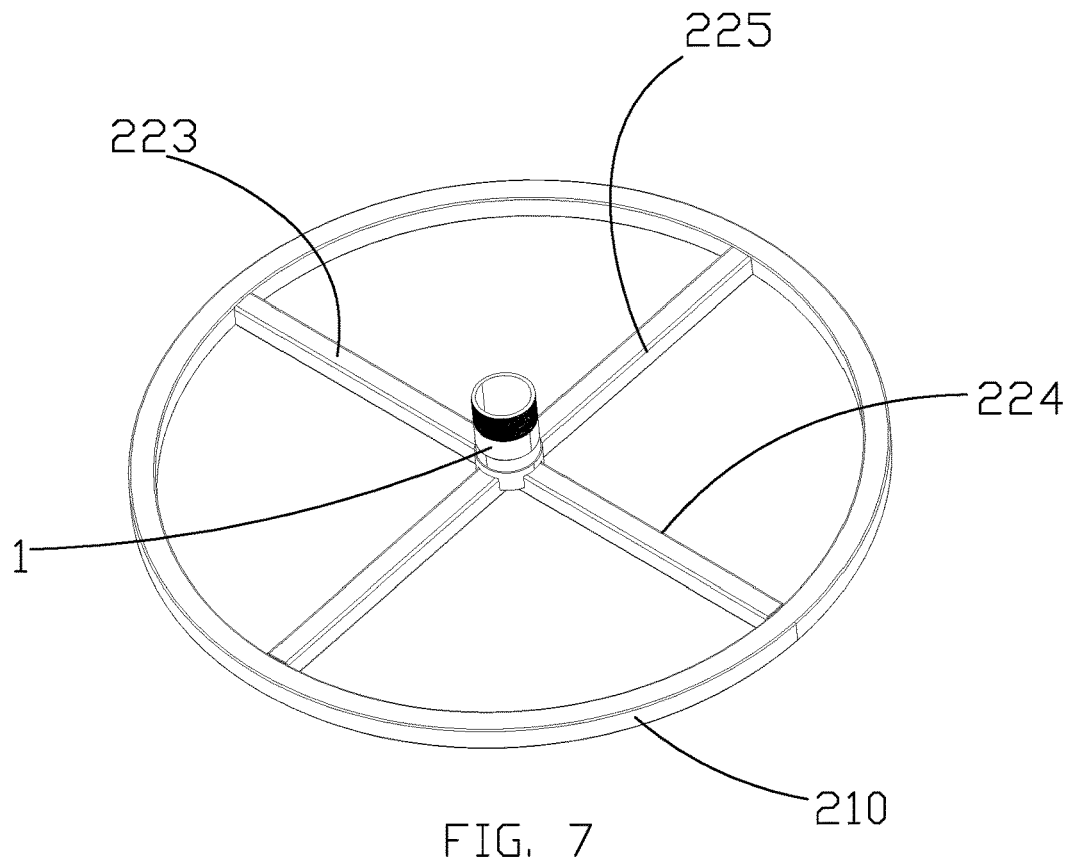
FIG. 7 is a structural schematic diagram of a 360-degree photo booth according to embodiment 4 of the present disclosure.
Figure 8:
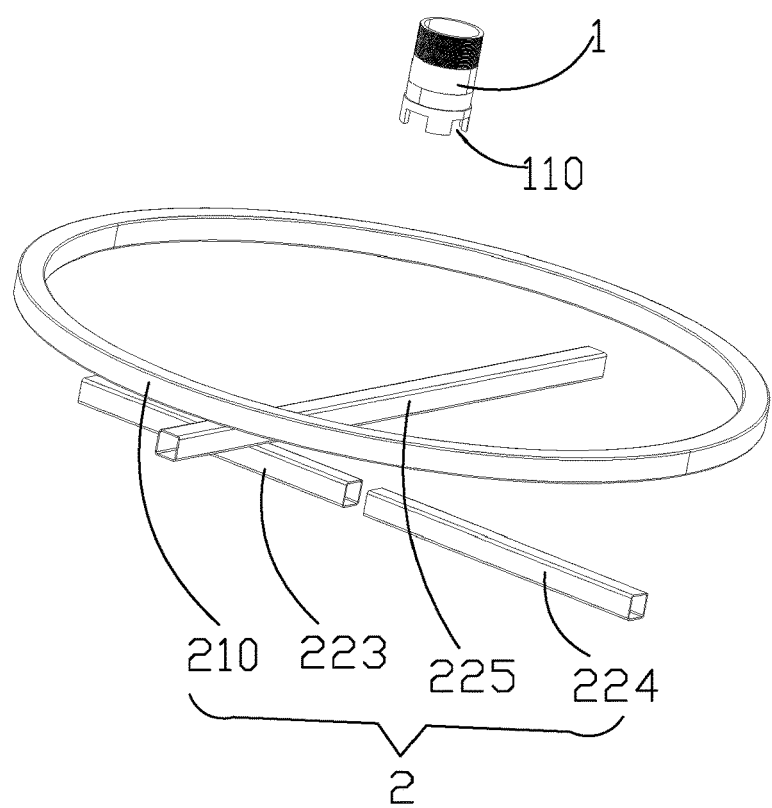
FIG. 8 is an exploded diagram of the 360-degree photo booth according to embodiment 4 of the present disclosure.

Referring to FIGS. 7, 8 and 10, embodiment 4: the supporting rods includes a third supporting rod 223, a fourth supporting rod 224, and a fifth supporting rod 225, the third supporting rod 223 and the fourth supporting rod 224 have approximately same lengths, two ends of the fifth supporting rod 225 are respectively connected to the supporting ring 210, a first end of the third supporting rod 223, and a first end of the fourth supporting rod 224 are respectively connected to the supporting ring 210, a second end of the third supporting rod 223, and a second end of the fourth supporting rod 224 are respectively connected to a middle portion of the fifth supporting rod 225, and edges of the anti-collision slots 110 are welded to the third supporting rod 223, the fourth supporting rod 224, and the fifth supporting rod 225.

In the embodiment, when the quantity of the supporting rods is three, the third supporting rod 223, the fourth supporting rod 224, and the fifth supporting rod 225 roughly form a "cross". And a quantity of the anti-collision slots 110 is four, the third supporting rod 223, the fourth supporting rod 224, and the fifth supporting rod 225 are engaged in the four anti-collision slots 110 at a position where the third supporting rod 223, the fourth supporting rod 224, and the fifth supporting rod 225 intersect with each other. In the embodiment, the supporting ring 210 can be omitted.

Figure 9:
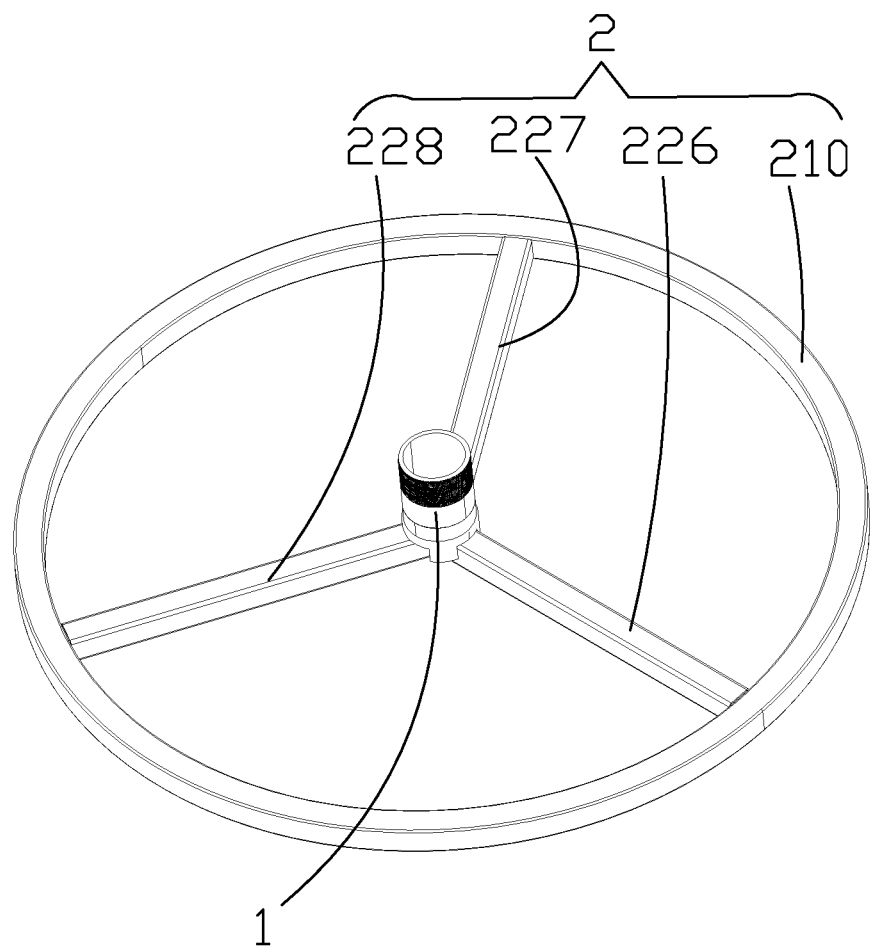
FIG. 9 is a structural schematic diagram of a 360-degree photo booth according to embodiment 5 of the present disclosure.

Referring to FIG. 9, embodiment 5: the supporting rods includes a sixth supporting rod 226, a seventh supporting rod 227, and an eighth supporting rod 228. The sixth supporting rod 226, the seventh supporting rod 227, and the eighth supporting rod 228 have approximately same lengths. A first end of the sixth supporting rod 226, a first end of the seventh supporting rod 227, and a first end of the eighth supporting rod 228 are connected to the supporting ring 210, a second end of the sixth supporting rod 226, a second end of the seventh supporting rod 227, and a second end of the eighth supporting rod 228 are connected to each other, and edges of the plurality of the anti-collision slots 110 are welded to the sixth supporting rod 226, the seventh supporting rod 227, and the eighth supporting rod 228.

In the embodiment, when the quantity of the supporting rods 220 is three, the second end of the sixth supporting rod 226, the second end of the seventh supporting rod 227, and the second end of the eighth supporting rod 228 are connected to each other. In some embodiment, adjacent two of the supporting rods 220 roughly form an angle of 120 degree. And a quantity of the plurality of the anti-collision slots 110 is three, an intersection portion of the sixth supporting rod 226, the seventh supporting rod 227, and the eighth supporting rod 228 are engaged in the three anti-collision slots 110. In the embodiment, the supporting ring 210 can be omitted.

Furthermore, the supporting main shaft 1 is located approximately at a center of the supporting base 2, and the supporting main shaft 1 is coaxial with the supporting ring 210.

The design of the 360-degree photo booth is aesthetically pleasing, and the supporting main shaft 1 and the supporting base 2 apply more balanced forces on a standing stage supported by the supporting main shaft 1.

Figure 15:
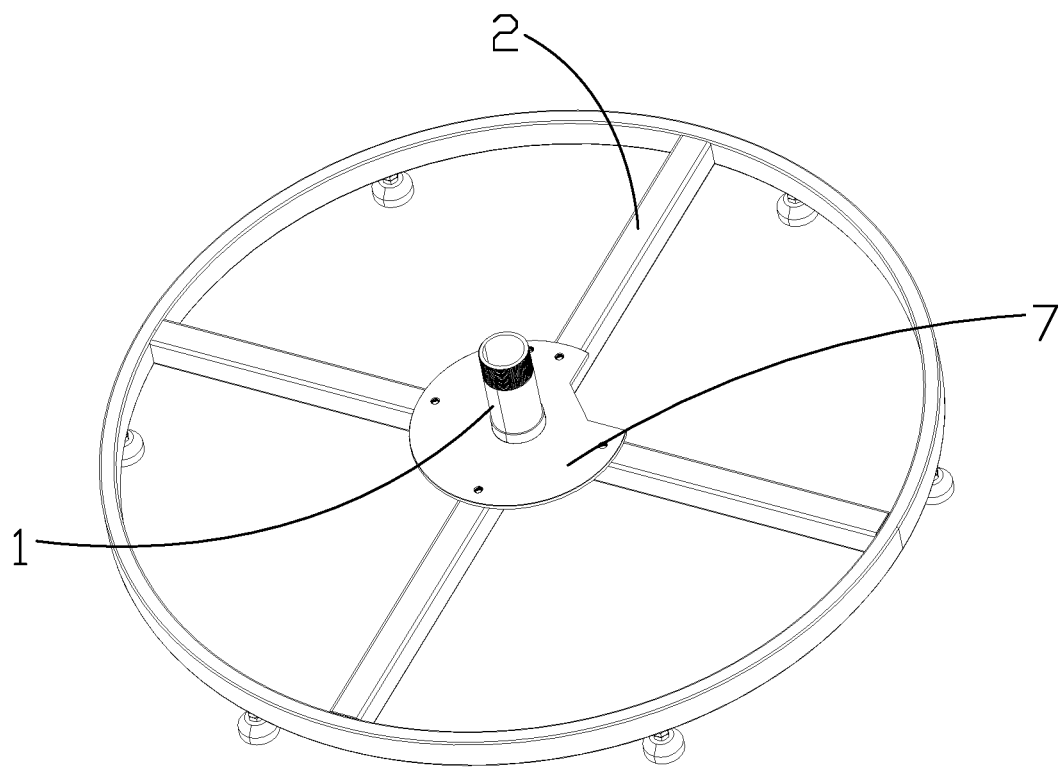
FIG. 15 is a schematic diagram of connection between a base and a supporting main shaft of the 360-degree photo booth in a prior art.
Figure 16:
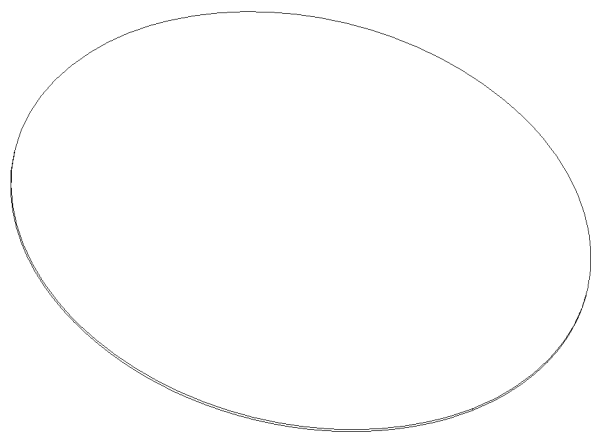
FIG. 16 is a schematic diagram of welding connection between the base and the supporting main shaft of the 360-degree photo booth in a prior art.
Figure 17:
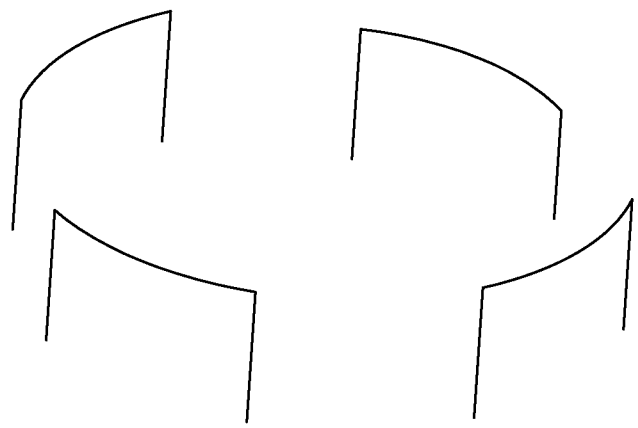
FIG. 17 is a schematic diagram of welding connection between the supporting base and the supporting main shaft of the 360-degree photo booth according to embodiment 1, 3, or 4 of the present disclosure.
Figure 18:
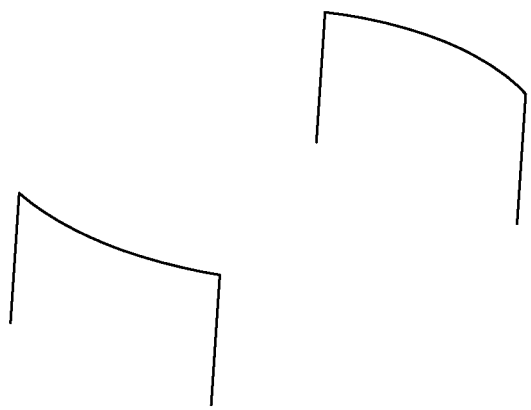
FIG. 18 is a schematic diagram of welding connection between the supporting base and the supporting main shaft of the 360-degree photo booth according to embodiment 2 of the present disclosure.
Figure 19:
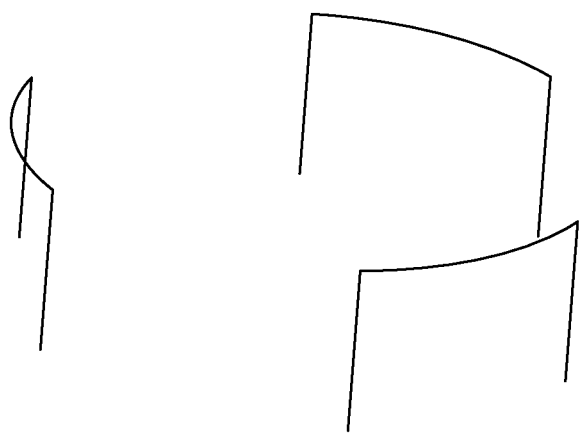
FIG. 19 is a schematic diagram of welding connection between the supporting base and the supporting main shaft of the 360-degree photo booth according to embodiment 5 of the present disclosure.

In prior arts, an end cover 7 is disposed on the supporting base 2 to connect the supporting base 2 and the supporting main shaft 1. The end cover 7 increases manufacturing cost and difficulty, and connection strength and stability are not as good as the connection structure provided in the embodiment. Referring to FIGS. 17 to 19, FIGS. 17 to 19 are schematic diagrams of welding connection between the supporting main shaft 1 and the supporting base 2 of the 360-degree photo booth provided by the present disclosure, and further referring to FIGS. 15 and 16, FIGS. 15 and 16 are schematic diagrams of connection between the end cover 7 and the supporting main shaft 1 of the 360-degree photo booth in prior arts. After comparison, it is obvious that the connection structure of the present disclosure is more reliable and stable, and firmness of the connection between the supporting base 2 and the supporting main shaft 1 can be ensured after welding, and risks of welding seam and fracture can be avoided.

In addition, in some hypothetical cases, if pseudo soldering and soldering failure occur between the supporting main shaft 1 and the supporting rod(s) 220 in the present disclosure, since the one or more of the supporting rods 220 are accommodated in the plurality of the anti-collision slots 110, the one or more of the supporting rods 220 and the supporting main shaft 1 are still engaged to each other. Therefore, when users stand on the standing stage supported by the second end of the supporting main shaft 1, with the stable connection between the support base 2 and the supporting main shaft 1 provided in the embodiment, safety of the users can still be guaranteed.

However, in the prior arts, if the pseudo soldering and the soldering failure occur between one end of the supporting main shaft 1 and an end surface of the end cover 7, the supporting main shaft 1 and the end cover 7 immediately separate from each other, and the standing stage supported by the second end of the supporting main shaft 1 will collapse. When the users stand on such kind of connection structure, obviously, safety factor is low.

Referring to FIG. 10, embodiment 6: the high-stability 360-degree photo booth includes a supporting stage 3 connected to a second end of the supporting main shaft 1. The supporting stage 3 includes a supporting cover plate 310 and a reinforcement frame 320, the supporting cover plate 310 detachably covers the reinforcement frame 320, and a shock absorber 330 is disposed between the supporting cover plate 310 and the reinforcement frame 320.

The supporting stage 3 provides support to the users for standing on the 360-degree photo booth, when the users walk or jump on the supporting stage 3, power generated by the users will be transmitted along the supporting stage 3, and finally transmitted to shooting devices connected to the 360-degree photo booth, for example, a hand phone, a camera etc., and the shooting devices are driven to vibrate, so that blurry is induced in videos or photo images captured by the shooting devices during photography or videography, which affects user experience. Through disposing the shock absorber 330 between the supporting cover plate 310 and the reinforcement frame 320, great shock absorption can be provided, stability in use of the 360-degree photo booth is improved, and so does the user experience.

Moreover, the shock absorber 330 which functions as a shock-absorbing buffer, which not only reduces the transmission of power of the users to the shooting devices, and prevent the 360-degree photo booth from shaking, but also extends service life of the supporting cover plate 310 and the reinforcement frame 320, and reduces the maintenance cost of the 360-degree photo booth to a certain extent, which save more resources.

In addition, the supporting cover plate 310 detachably covers the reinforcing frame 320, so when the supporting cover plate 310 and the shock absorber 330 need to be maintained and replaced, they can be easily replaced, thereby avoiding cost burden for the users to replace the entire set of the 360-degree photo booth.

Figure 11:
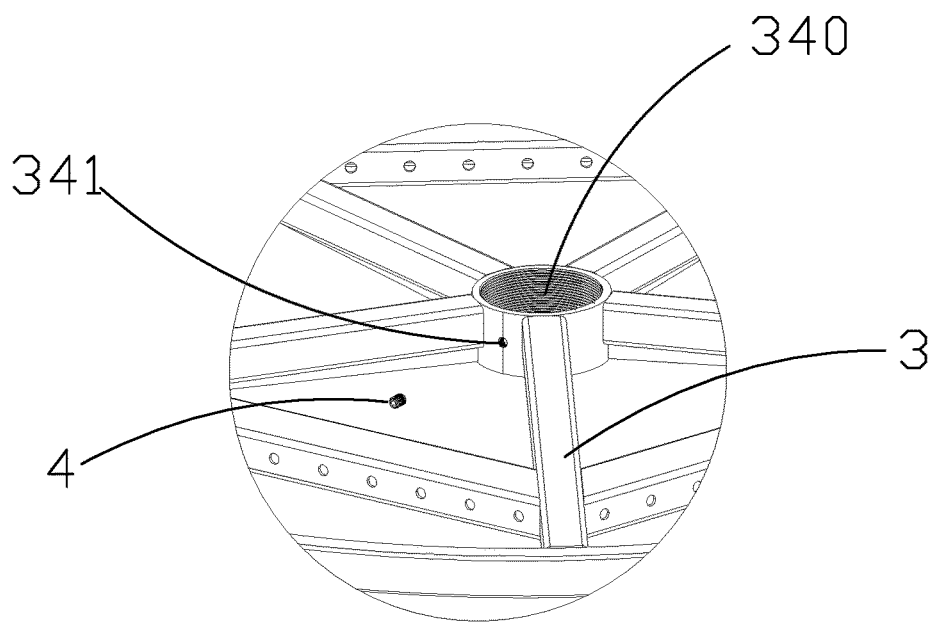
FIG. 11 is an enlarged view of part A of FIG. 10.

Referring to FIGS. 10 and 11, embodiment 7: the high-stability 360-degree photo booth includes a supporting stage 3 and a supporting main shaft 1. A first connecting portion 120 is disposed at a first end of the supporting main shaft 1, a second connecting portion 340 sleeved on the first connecting portion 120 is disposed at the supporting stage 3, a threaded through hole 341 is defined in the second connecting portion 340, the threaded through hole 341 is penetrated through by a locking screw 4 to abut against an outer wall of the first connecting portion 120 to reinforce connection between the supporting stage 3 and the supporting main shaft 1.

In some embodiments, the first connecting portion 120 and the second connecting portion 340 are threadedly connected, the second connecting portion 340 is substantially a sleeve structure, and the second connecting portion 340 is an internal thread of the sleeve, and the first connecting portion 12 is an external thread disposed on the supporting main shaft 1. Through defining the threaded through hole 341 in the second connecting portion 340 and penetrating through the threaded through hole 341 with the locking screw 4 to abut against the outer wall of the first connecting portion 120 to reinforce the connection between the supporting stage 3 and the supporting main shaft 1 for purpose of anti-loose and anti-vibration, instability and failure of connection between the supporting stage 3 and the supporting main shaft 1 is greatly avoided, and hidden dangers to the safety of the users caused by relative movements, such as circumferential relative rotation and axial movement, between the supporting stage 3 and the supporting main shaft 1 are avoided.

Figure 12:
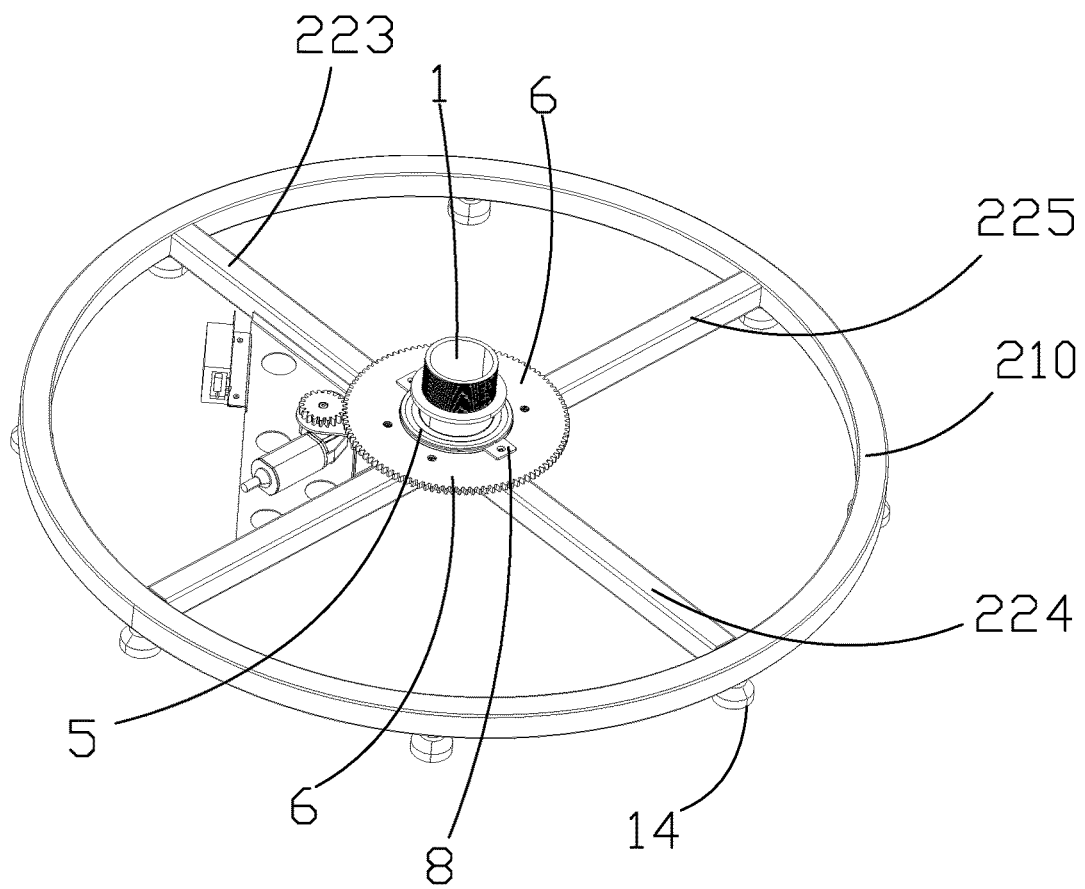
FIG. 12 is a structural schematic diagram of a 360-degree photo booth according to embodiment 8 of the present disclosure.
Figure 13:
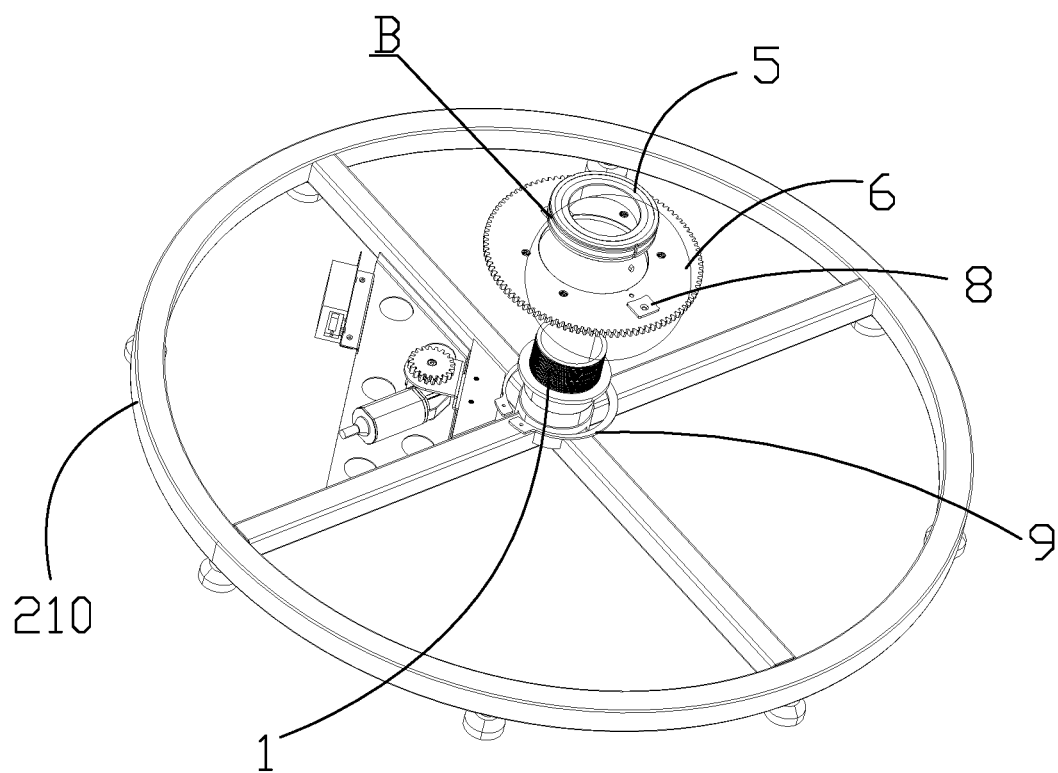
FIG. 13 is an exploded diagram of the 360-degree photo booth according to embodiment 8 of the present disclosure.
Figure 14:
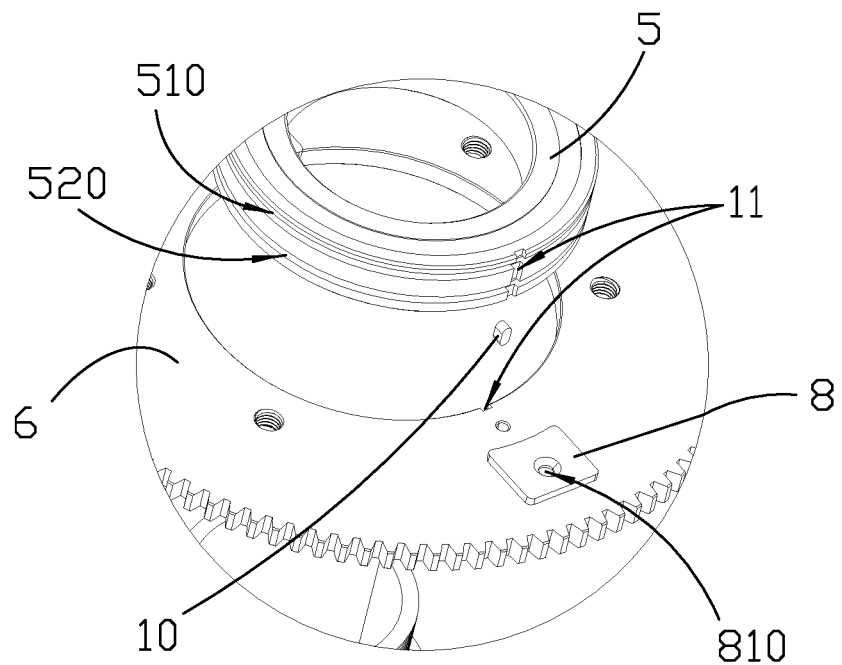
FIG. 14 is an enlarged view of part B of FIG. 13.

Referring to FIGS. 12 to 14, embodiment 8: the high-stability 360-degree photo booth includes a bearing 5, a transmission part 6, a first connecting part 8, a second connecting part 9, and a locking key 10. An inner ring of the bearing 5 is sleeved on an outer wall of the supporting main shaft 1, the transmission part 6 is sleeved on an outer ring of the bearing 5, a first connecting slot 510 and a second connecting slot 520 are defined in the bearing 5, the first connecting part 8 and the second connecting part 9 are respectively connected to the first connecting slot 510 and the second connecting slot 520 to clamp and fix the transmission part 6 between the first connecting part 8 and the second connecting part 9, and a key slot 11 is defined between the bearing 5 and the transmission part 6, the locking key 10 is accommodated in the key slot 11, and the locking key 10 is limited between the first connecting part 8 and the second connecting part 9.

In some embodiments, the transmission part 6 can be a gear, a pulley, or a friction wheel, etc., and an end surface of the transmission part 6 is connected to a rotating shooting stand 12 of the 360-degree photo booth, the transmission part 6 is sleeved on the outer ring of the bearing 5, and the inner ring of the bearing 5 is sleeved on the outer wall of the supporting main shaft 1, therefore a driving device drives the transmission part 6, and the transmission part 6 drives the rotating shooting stand 12 to rotate around the supporting stage 3.

However, in the prior arts, connection between the transmission part 6 and the outer ring of the bearing 5 is unstable. First, sliding easily occurs between the transmission part 6 and the outer ring of the bearing 5. When the transmission part 6 is driven by the driving device, the transmission part 6 cannot effectively drive the rotating shooting stand 12 to rotate. Second, axial relative movements occur between the transmission part 6 and the outer ring of the bearing 5, and the transmission part 6 and the outer ring of the bearing 5 even disengage from each other. The connection between the transmission part 6 and the outer ring of the bearing 5 is unreliable and unstable.

Through defining the first connecting slot 510 and the second connecting slot 520 in the bearing 5, the first connecting part 8 and the second connecting part 9 are respectively connected to the first connecting slot 510 and the second connecting slot 520, the transmission part 6 is clamped and fixed between the first connecting part 8 and the second connecting part 9, the axial relative movements between the transmission part 6 and the outer ring of the bearing 5 are avoided.

Through defining the key slot 11 between the bearing 5 and the transmission part 6, the locking key 10 is accommodated in the key slot 11, and the locking key 10 is limited between the first connecting part 8 and the second connecting part 9, thereby avoiding sliding between the transmission part 6 and the outer ring of the bearing 5. The locking key 10 is limited between the first connecting part 8 and the second connecting part 9, thereby avoiding disengagement of the locking key 10 from the key slot 11.

In some embodiments, the first connecting part 8 is substantially a sheet with a connecting hole 810 is formed thereon, and the first connecting part 8 is partially inserted into the first connecting slot 510. The first connecting part 8 and the transmitting part 6 are fastened by a locking screw (not shown in the drawings) penetrating through the connecting hole 810 and the transmission part 6, and the second connecting part 9 can be a circlip. In some embodiments, the first connecting part 8 can also be a circlip.

Through this design, the transmission part 6 can also be disassembled and separated from the bearing 5, which facilitates replacement and maintenance of parts.

Referring to FIG. 10, the present disclosure provides a high-stability 360-degree photo booth including a supporting stage 3. The supporting stage 3 includes a supporting cover plate 310 and a reinforcement frame 320, and a shock absorber 330 is disposed between the supporting cover plate 310 and the reinforcement frame 320.

The supporting stage 3 provides support to the users for standing on the 360-degree photo booth, when the users walk or jump on the supporting stage 3, power generated by the users will be transmitted along the supporting stage 3, and finally transmitted to shooting devices connected to the 360-degree photo booth, for example, the hand phone, the camera etc., the shooting devices are driven to vibrate, and blurry is induced in videos or photo images captured by the shooting devices during photography or videography, which affects user experience. Through disposing the shock absorber 330 between the supporting cover plate 310 and the reinforcement frame 320, great shock absorption can be provided, stability in use of the 360-degree photo booth is improved, and so does the user experience.

Moreover, the shock absorber 330 which functions as a shock-absorbing buffer, which not only reduces the transmission of the power of the users to the shooting devices, and prevents the 360-degree photo booth from shaking, but also extends service life of the supporting cover plate 310 and the reinforcement frame 320, and reduces the maintenance cost of the 360-degree photo booth to a certain extent, which save more resources.

Furthermore, the supporting cover plate 310 detachably covers the reinforcement frame 320.

Referring to FIG. 10, furthermore, the shock absorber 330 is a shock-absorbing cotton pad, and the shock-absorbing cotton pad is shaped like an upper end surface of the reinforcing frame 320.

The shock-absorbing cotton pad is shaped like the upper end surface of the reinforcing frame 320, which avoids that the shock absorber 330 is a single piece of material, thereby saving material and reducing costs.

Referring to FIGS. 10 and 11, the present disclosure provides a high-stability 360-degree photo booth including a supporting stage 3 and a supporting main shaft 1. A first connecting portion 120 is disposed at a first end of the supporting main shaft 1, a second connecting portion 340 sleeved on the first connecting portion 120 is disposed at the supporting stage 3, a threaded through hole 341 is defined in the second connecting portion 340, the threaded through hole 341 is penetrated through by a locking screw 4 to abut against an outer wall of the first connecting portion 120 to reinforce connection between the supporting stage 3 and the supporting main shaft 1.

In some embodiments, the first connecting portion 120 and the second connecting portion 340 are threadedly connected, the second connecting portion 340 is substantially a sleeve structure, and the second connecting portion 340 is an internal thread of a sleeve, and the first connecting portion 12 is an external thread disposed on the supporting main shaft 1. Through defining the threaded through hole 341 in the second connecting portion 340 and penetrating through the threaded through hole 341 with the locking screw 4 to abut against the outer wall of the first connecting portion 120 to reinforce the connection between the supporting stage 3 and the supporting main shaft 1 for purpose of anti-loose and anti-vibration, instability and failure of connection between the supporting stage 3 and the supporting main shaft 1 are greatly avoided, and hidden dangers to the safety of the users caused by relative movements, such as circumferential relative rotation and axial movement, between the supporting stage 3 and the supporting main shaft 1 are avoided.

Preferably, a plurality of height-adjustable feet 14 are disposed on a lower end surface of the supporting ring 210.

What is claimed is:

1. A high-stability 360-degree photo booth, comprising:
   a supporting main shaft; and
   a supporting base;
   wherein the supporting base comprises at least two supporting rods intersecting and connected with each other, or the supporting base comprises a supporting ring and at least one supporting rod connected to the supporting ring; a plurality of anti-collision slots capable of clamping the at least two supporting rod is defined at a first end of the supporting main shaft, and the at least two supporting rods are or the at least one supporting rod is welded to the supporting main shaft at a position where the supporting main shaft is engaged with the at least two supporting rods are or the at least one supporting rod.

2. The high-stability 360-degree photo booth according to claim 1, wherein a quantity of the at least two supporting rods is two, the at least two supporting rods comprise a first supporting rod and a second supporting rod, an evading slot capable of engaging with the second supporting rod is defined at the first supporting rod, and both ends of the first supporting rod and the second supporting rod are connected to the supporting ring.

3. The high-stability 360-degree photo booth according to claim 1, wherein a quantity of the at least two supporting rods is three;
   the at least two supporting rods comprise a first supporting rod, a second supporting rod, and a third supporting rod; the first supporting rod and the second supporting rod have approximately same lengths, two ends of the third supporting rod are respectively connected to the supporting ring, a first end of the first supporting rod and a first end of the second supporting rod are respectively connected to the supporting ring, a second end of the first supporting rod and a second end of the second supporting rod are respectively connected to a middle portion of the third supporting rod, and edges of the plurality of the anti-collision slots are welded to the first supporting rod, the second supporting rod, and the third supporting rod; or
   the at least two supporting rods comprise a first supporting rod, a second supporting rod, and an third supporting rod; the first supporting rod, the second supporting rod, and the third supporting rod have approximately same lengths; a first end the first supporting rod, a first end of the second supporting rod, and a first end of the third supporting rod are respectively connected to the supporting ring, a second end of the first supporting rod, a second end of the second supporting rod, and a second end of the third supporting rod are connected with each other, and edges of the plurality of the anti-collision slots are welded to the first supporting rod, the second supporting rod, and the third supporting rod.

4. The high-stability 360-degree photo booth according to claim 1, wherein the supporting main shaft is located approximately at a center of the supporting base, and the supporting main shaft is coaxial with the supporting ring.

5. The high-stability 360-degree photo booth according to claim 1, further comprising a supporting stage connected to a second end of the supporting main shaft, wherein the supporting stage comprises a supporting cover plate and a reinforcement frame; the supporting cover plate detachably covers the reinforcement frame, and a shock absorber is disposed between the supporting cover plate and the reinforcement frame.

6. The high-stability 360-degree photo booth according to claim 1, further comprising a supporting stage; wherein a first connecting portion is disposed at a second end of the supporting main shaft, a second connecting portion sleeved on the first connecting portion is disposed at the supporting stage; a threaded through hole is defined in the second connecting portion, the threaded through hole is penetrated through by a locking screw to abut against an outer wall of the first connecting portion to reinforce connection between the supporting stage and the supporting main shaft.

7. The high-stability 360-degree photo booth according to claim 1, further comprising a bearing, a transmission part, a first connecting part, a second connecting part, and a locking key; wherein an inner ring of the bearing is sleeved on an outer wall of the supporting main shaft, the transmission part is sleeved on an outer ring of the bearing, a first connecting slot and a second connecting slot are defined in the bearing, the first connecting part and the second connecting part are respectively connected to the first connecting slot and the second connecting slot to clamp and fix the transmission part between the first connecting part and the second connecting part, the bearing and the transmission part corporately define a key slot at corresponding edges of the bearing and the transmission part, the locking key is accommodated in the key slot, and the locking key is limited between the first connecting part and the second connecting part.

8. A high-stability 360-degree photo booth, comprising:
a supporting stage;
wherein the supporting stage comprises a supporting cover plate and a reinforcement frame, and a shock absorber is disposed between the supporting cover plate and the reinforcement frame, wherein reinforcement frame comprises a plurality of sub-frames connected with a main shaft, and the reinforcement frame is stellar shaped, and the shock absorber has a stellar shaped corresponding to the reinforcement frame.

9. The high-stability 360-degree photo booth according to claim 8, wherein the shock absorber is a shock-absorbing cotton pad, and the shock-absorbing cotton pad is shaped like an upper end surface of the reinforcing frame.

10. The high-stability 360-degree photo booth according to claim 8, wherein further comprising a supporting base, the supporting base comprises at least two supporting rods intersecting and connected with each other, or the supporting base comprises a supporting ring and at least one supporting rod connected to the supporting ring; a plurality of anti-collision slots capable of clamping the at least two supporting rod is defined at a first end of the supporting main shaft, and the at least two supporting rods are or the at least one supporting rod is welded to the supporting main shaft at a position where the supporting main shaft is engaged with the at least two supporting rods are or the at least one supporting rod.

11. The high-stability 360-degree photo booth according to claim 10, wherein a quantity of the at least two supporting rods is two, the at least two supporting rods comprise a first supporting rod and a second supporting rod, an evading slot capable of engaging with the second supporting rod is defined at the first supporting rod, and both ends of the first supporting rod and the second supporting rod are connected to the supporting ring.

12. A high-stability 360-degree photo booth, comprising:
a supporting stage; and
a supporting main shaft;
wherein a first connecting portion is disposed at a first end of the supporting main shaft, a second connecting portion sleeved on the first connecting portion is disposed at the supporting stage, a threaded through hole is defined in the second connecting portion, the threaded through hole is penetrated through by a locking screw to abut against an outer wall of the first connecting portion to reinforce connection between the supporting stage and the supporting main shaft;
wherein further comprising a supporting base, the supporting base comprises at least two supporting rods intersecting and connected with each other, or the supporting base comprises a supporting ring and at least one supporting rod connected to the supporting ring; a plurality of anti-collision slots capable of clamping the at least two supporting rod is defined at a first end of the supporting main shaft, and the at least two supporting rods are or the at least one supporting rod is welded to the supporting main shaft at a position where the supporting main shaft is engaged with the at least two supporting rods are or the at least one supporting rod.

13. The high-stability 360-degree photo booth according to claim 12, wherein a quantity of the at least two supporting rods is two, the at least two supporting rods comprise a first supporting rod and a second supporting rod, an evading slot capable of engaging with the second supporting rod is defined at the first supporting rod, and both ends of the first supporting rod and the second supporting rod are connected to the supporting ring.

14. The high-stability 360-degree photo booth according to claim 12, wherein the supporting stage comprises a supporting cover plate and a reinforcement frame, and a shock absorber is disposed between the supporting cover plate and the reinforcement frame wherein reinforcement frame comprises a plurality of sub-frames connected with a main shaft, and the reinforcement frame is stellar shaped, and the shock absorber has a stellar shaped corresponding to the reinforcement frame.

15. The high-stability 360-degree photo booth according to claim 14, wherein the shock absorber is a shock-absorbing cotton pad, and the shock-absorbing cotton pad is shaped like an upper end surface of the reinforcing frame.

16. The high-stability 360-degree photo booth according to claim 12, further comprising a bearing, a transmission part, a first connecting part, a second connecting part, and a locking key; wherein an inner ring of the bearing is sleeved on an outer wall of the supporting main shaft, the transmission part is sleeved on an outer ring of the bearing, a first connecting slot and a second connecting slot are defined in the bearing, the first connecting part and the second connecting part are respectively connected to the first connecting slot and the second connecting slot to clamp and fix the transmission part between the first connecting part and the second connecting part, the bearing and the transmission part corporately define a key slot at corresponding edges of the bearing and the transmission part, the locking key is accommodated in the key slot, and the locking key is limited between the first connecting part and the second connecting part.

\* \* \* \* \*